United States Patent
Wang

(10) Patent No.: US 9,241,046 B2
(45) Date of Patent: Jan. 19, 2016

(54) METHODS AND SYSTEMS FOR SPEEDING UP DATA RECOVERY

(71) Applicant: CA, Inc., Islandia, NY (US)

(72) Inventor: Zhiye Wang, Beijing (CN)

(73) Assignee: CA, Inc., New York, NY (US)

( * ) Notice: Subject to any disclaimer, the term of this patent is extended or adjusted under 35 U.S.C. 154(b) by 435 days.

(21) Appl. No.: 13/713,355

(22) Filed: Dec. 13, 2012

(65) Prior Publication Data

US 2014/0172950 A1   Jun. 19, 2014

(51) Int. Cl.
*G06F 15/16* (2006.01)
*H04L 29/06* (2006.01)
*H04L 29/08* (2006.01)

(52) U.S. Cl.
CPC ............ *H04L 67/42* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 5,987,506 A * | 11/1999 | Carter et al. | .................. | 709/213 |
| 6,742,092 B1 * | 5/2004 | Huebsch et al. | .............. | 711/162 |
| 7,921,179 B1 * | 4/2011 | Zheng et al. | .................. | 709/213 |
| 2004/0139260 A1 * | 7/2004 | Steinmetz et al. | ............ | 710/269 |
| 2006/0248294 A1 * | 11/2006 | Nedved et al. | ............... | 711/162 |
| 2008/0140944 A1 * | 6/2008 | Arakawa et al. | .............. | 711/148 |
| 2009/0254468 A1 * | 10/2009 | Acedo et al. | ..................... | 705/35 |
| 2010/0153568 A1 * | 6/2010 | Uola et al. | ..................... | 709/229 |
| 2010/0179984 A1 * | 7/2010 | Sebastian | ...................... | 709/203 |
| 2010/0332401 A1 * | 12/2010 | Prahlad et al. | ................. | 705/80 |
| 2011/0231475 A1 * | 9/2011 | Van der Merwe et al. | .... | 709/203 |
| 2013/0144939 A1 * | 6/2013 | Prahlad | ........................ | 709/203 |
| 2014/0156777 A1 * | 6/2014 | Subbiah et al. | ............... | 709/213 |

* cited by examiner

*Primary Examiner* — Brian P Whipple
(74) *Attorney, Agent, or Firm* — Baker Botts L.L.P.

(57) ABSTRACT

A method for providing recovery from a remote server to a client includes sending at least one data restore request to the remote server. A data block identifier are received at the client system via a network. A data block associated with the data block identifier is retrieved from a local backup server associated with the client system if the local back up server stores the data block. The data block associated with the data block identifier is received from the remote server if the local backup server does not store the data block. The data block is restored to the client system.

35 Claims, 5 Drawing Sheets

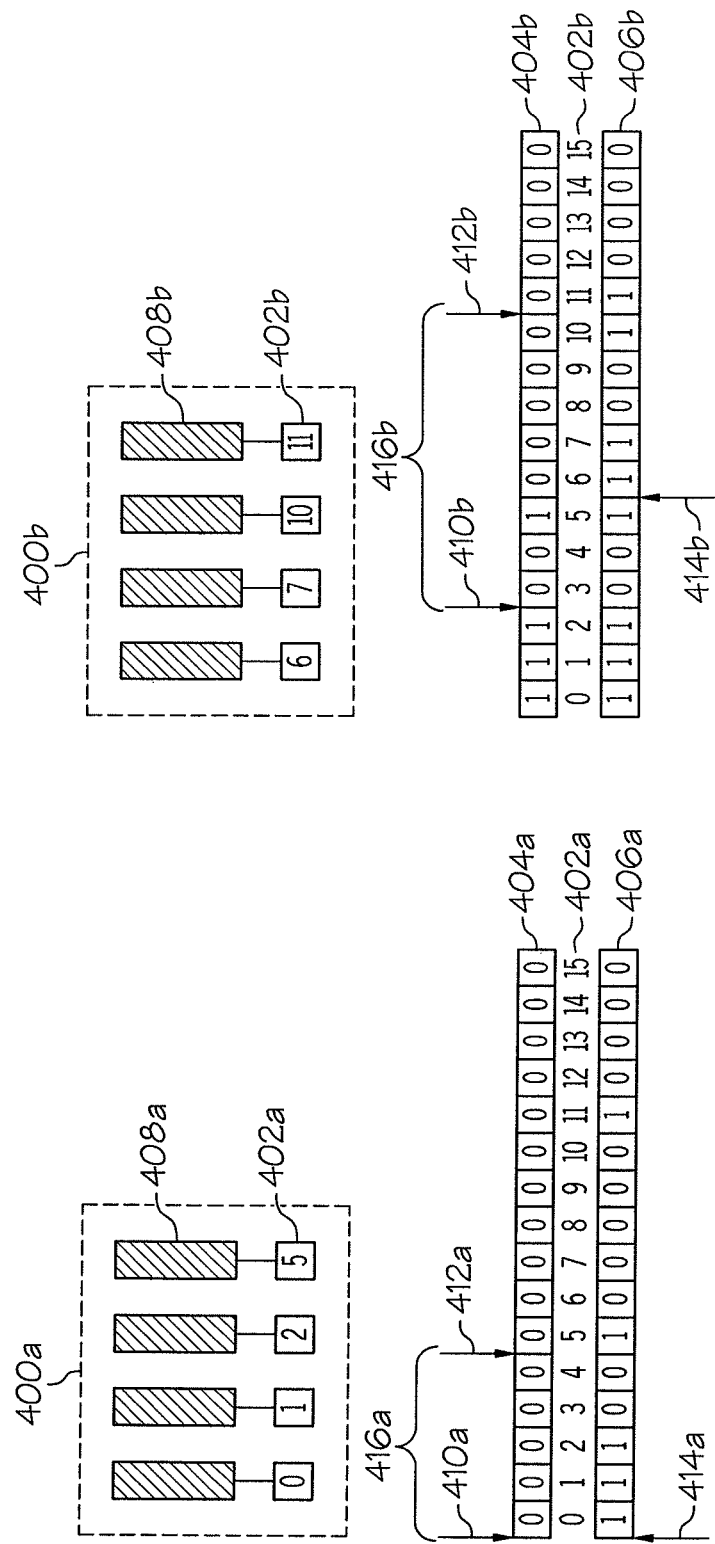

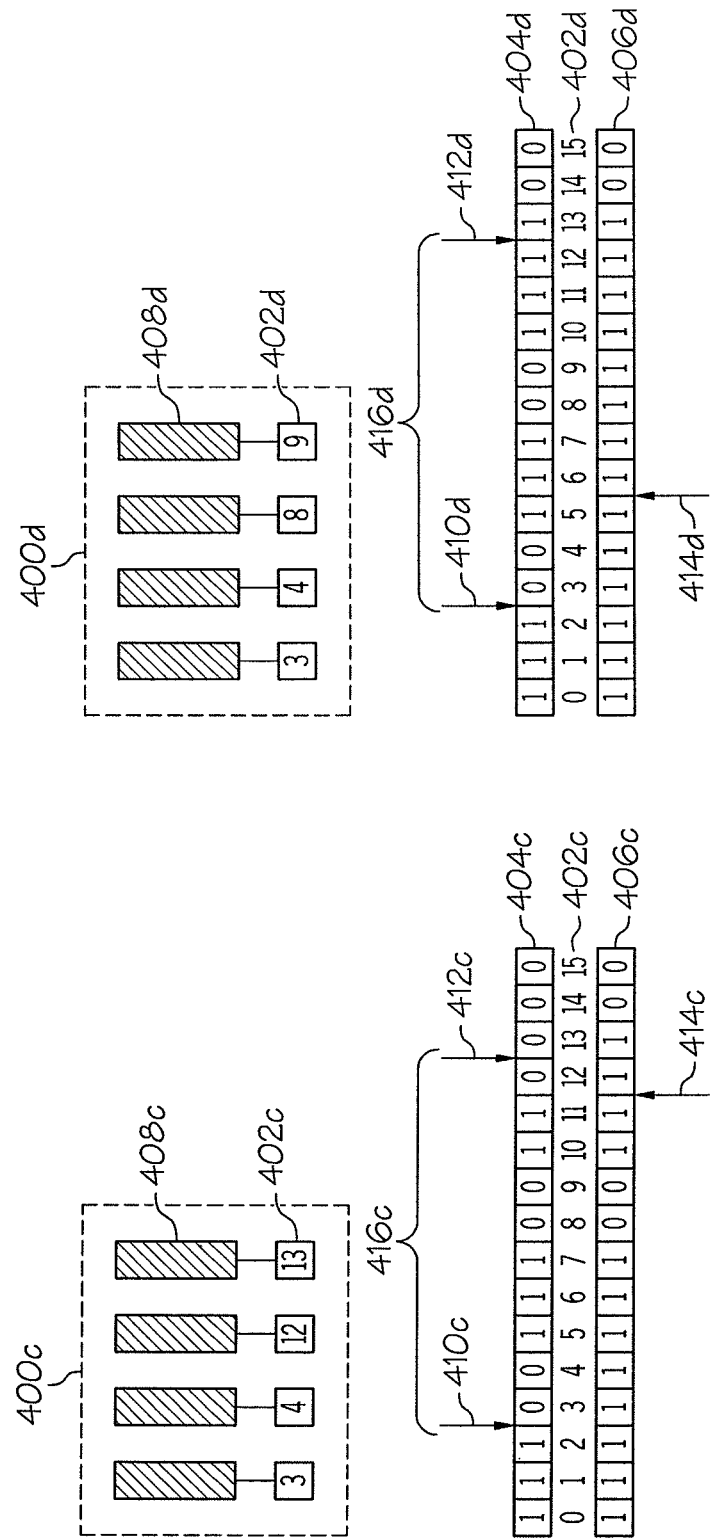

METHODS AND SYSTEMS FOR SPEEDING UP DATA RECOVERY

BACKGROUND

1. Field of the Disclosure

The present disclosure relates to data recovery, and more specifically, to systems and methods for speeding up data recovery from a server to a client.

2. Description of Related Art

A managed services provider (MSP) may include an information technology (IT) services provider that manages and assumes responsibility for providing a defined set of services to their clients. One such service may include data protection of the client's servers. For example, a MSP may provide a back up system for moving data from the client's servers to a central datastore that is managed by the MSP. Additionally, the MSP may provide a system for data recovery from the MSP datastore to the client's servers. However, the recovery of large amounts of data from the MSP datastore may be slow and inefficient. where the network connection between the MSP and the client's systems is a typical Internet (WAN) connection

BRIEF SUMMARY

In accordance with the present invention, disadvantages and problems associated with previous techniques for data recovery from a MSP to a client system may be reduced or eliminated.

According to one aspect of the present disclosure, a method for providing recovery from a remote server to a client may be provided. In this method, at least one data restore request is sent to the remote server. A data block identifier are received at the client system via a network. A data block associated with the data block identifier is retrieved from a local backup server associated with the client system if the local back up server stores the data block. The data block associated with the data block identifier is received from the remote server if the local backup server does not store the data block. The data block is restored to the client system.

Certain embodiments of the invention may provide one or more technical advantages. A technical advantage of one embodiment may be that duplicated data blocks that are stored on the client system may be used during the recovery process. As a result, the amount of data transmitted across a network may be minimized. Another technical advantage of one embodiment may be that a dynamic window scan may be provided to sequentially restore available data blocks while minimizing the amount of time wasted while waiting for unavailable data. Still other advantages may be that the dynamic window scan balances disk access performance and memory usage. As a result, the data recovery performance may be improved. Additionally, the speed with which data may be recovered from the MSP side to the client side may be improved. Still a further advantage may be that data recovery may be effected even over low bandwidth connections between the MSP side and the client side.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

Aspects of the present disclosure are illustrated by way of example and are not limited by the accompanying figures with like references indicating like elements.

FIGS. 4A-4D illustrate diagrams depicting the various states of an example memory pool of a client system using a dynamic window scan technique for data recovery.

DETAILED DESCRIPTION

Figure 1:
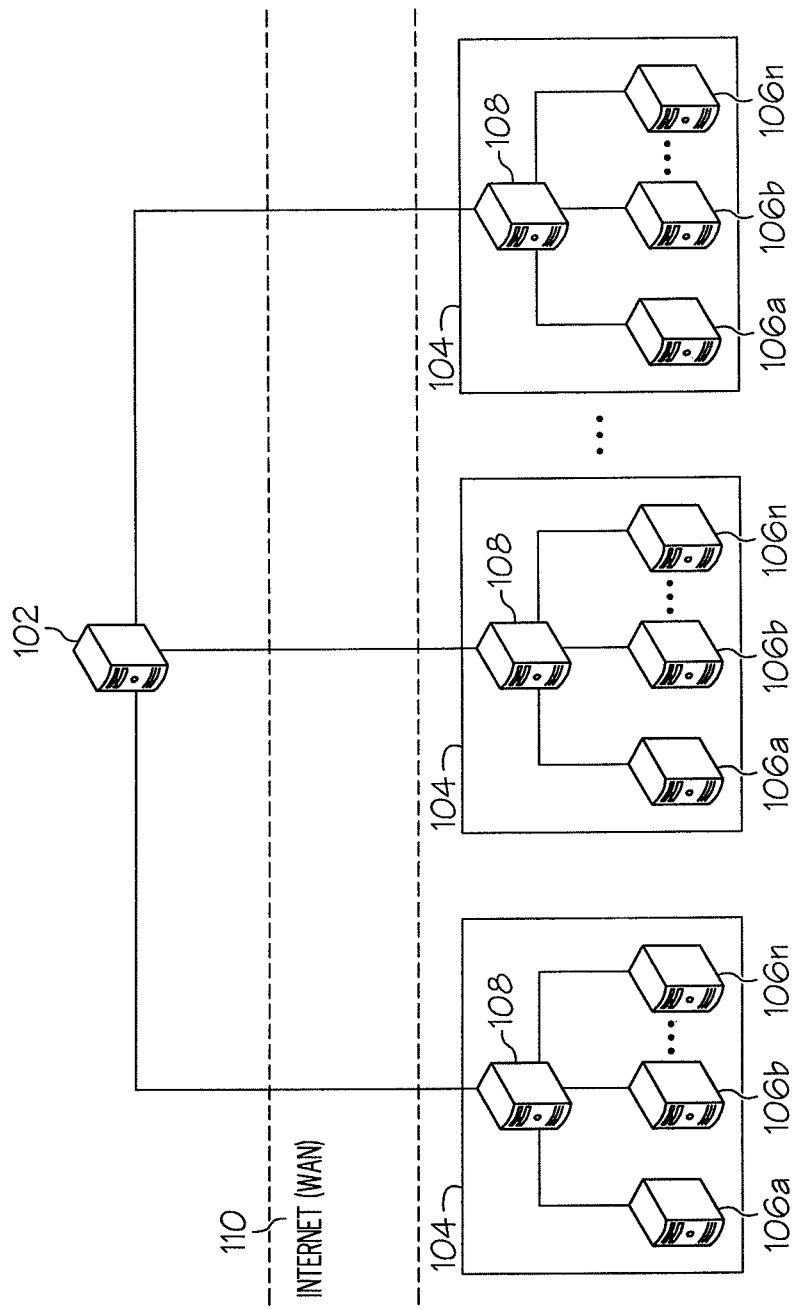
FIG. 1 illustrates a diagram depicting a managed services provider (MSP) system for providing data protection services to multiple client systems according to an aspect of the disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, a system 100 includes a managed services provider (MSP) storage server 102 that provides data protection services to at least one client system 104, according to one aspect of the disclosure. In the depicted embodiment, each client system 104 includes one or more production servers 106a-n and a local backup server 108. Each of production servers 106a-n and local backup server 108 may comprise one or more processors and memories for storing the data of client system 104. In particular embodiments, data stored on production servers 106a-n may be backed up locally to local backup server 108. Thus, the one or more processors of a production server 106a-n may include logic that, when executed, is operable to push data stored on the production server 106a-n to local backup server 108. Likewise, the one or more processors of local backup server 108 includes logic that, when executed, is operable to receive data from the production servers 106a-n and cause that data to be locally stored in the memory of production server 108 or another available local data store. The client data managed by production servers 106a-n and backup server 108 may include individual files, portions of files, file sets, directories, other suitable units of data, and/or any combination of any of the preceding. In a particular embodiment, the client data may be broken into data blocks.

MSP storage server 102 communicates with client systems 104 over network 110. In general, network 110 may be a wired connection, a wireless connection, or combinations thereof. Network 110 may be operable to allow data transmission between client systems 104 and MSP storage server 102. In a particular embodiment, network 110 includes a WAN connection such as the Internet. Where network 110 comprises the Internet, the bandwidth availability of network 110 may be limited. Though depicted as such, the network connection between client systems 104 and MSP storage server 102 need not be a direct connection.

In certain embodiments, MSP storage server 102 manages and assumes responsibility for providing a defined set of services for client systems 104. In particular, MSP storage server 102 may provide backup services and incremental data recovery services for client systems 104. Although MSP storage server 102 is depicted as providing services to three client systems 104, it is generally recognized that system 100 may include any number of client systems 104. As a result, MSP storage server 102 may provide backup services and data recovery services to any number of client systems 104.

For performing backup and recovery services, MSP storage server 102 includes one or more processors and memories or other data stores. The one or more processors of MSP storage server 102 may include logic that, when executed, is operable to receive data from client systems 104 and cause such data to be replicated to MSP storage server 102. One such method that may be used for the backup of client data may include disk to disk (D2D) backup. In one particular embodiment, MSP storage server 102 may use D2D backup to replicate the whole of a source disk (or volume) to another disk. For example, each disk of data stored on local backup server 108 or production servers 106a-n may be replicated, on a disk by disk basis, to MSP 102. In a reverse process, where restoration of data is requested by production servers 106a-n, MSP 102 may write data from the MSP storage server memory to a new disk on a production server 106a-n.

In a particular embodiment, MSP 102 and client systems 104 may use one of two types of D2D backup. Using a first type of D2D backup, a full backup of all data may be performed on the source disk of client system 104. However, because a full backup of a data source results in the replication of data that may have been backed up on a previous occasion, a full backup may be an inefficient mechanism for backing up data. This is especially true where the backup requires that large blocks of data are transmitted over a slow network connection such as Internet 110. It may not be practical to send such large blocks of data in a short period of time. Accordingly, to prevent the redundant transmission of data during a data backup, MSP 102 and client systems 104 may use a second type of D2D backup called an "incremental backup." Using this technique, only data that has changed since the last backup is transmitted over network 110. As such, in certain embodiments, incremental backup may provide a more efficient mechanism for backing up data to a remote location such as MSP storage server 102.

Data that has been incrementally backed up may be restored to a client system 104. For example, when a client system 104 requests restoration of data that has been previously backed up by MSP storage server 102, a check may be performed to determine if the requested data is in the current incremental backup. If it is determined that the requested data is stored in the current incremental backup, the data is restored from the incremental backup. Conversely, if the data is not in the current incremental backup, the data may be located in a previous incremental backup and restored from that previous incremental backup. In the worst case where no previous incremental backup is found to include the requested data, the data may be restored from a previous full backup. Regardless of whether the data is recovered from an incremental or full backup, the state of client 104 may be restored to the state when the backup was issued. Accordingly, all backups (both full and incremental) may be referred to as recovery points.

As depicted in FIG. 1, MSP storage server 102 uses D2D backup to protect the data stored on production servers 106a-n. In certain embodiments, recovery points may be first stored on local backup server 108 and then replicated to MSP storage server 102. Although all recovery points may be stored on both local backup server 108 and MSP storage server 102, it is generally recognized that it may be desirable to save disk space on client systems 104. Accordingly, in particular embodiments, only the most recent recovery points may be stored on local backup server 108. In such embodiments, all older recovery points may be stored on MSP storage server 102, and local backup server 108 may be purged of those older recovery points. The process of purging local backup server 108, which may include the merging of the oldest recovery points, is discussed below with regard to FIG. 2.

Returning to FIG. 1, one or both of MSP 102 and client systems 104 may, in particular embodiments, include data deduplication systems for further improving the efficiency of data backup from client systems 104. The deduplication systems of client system 104 and/or MSP 102 may respectively access memories of local backup server 108 and MSP storage server 102 to deduplicate a data set. Data deduplication may include a specialized data compression process that improves data backup performance. For example, data compression can reduce the amount of memory required at the backup destination. Data compression can also reduce the amount of data that is sent between client system 104 and MPS storage server 102. Accordingly, where data deduplication techniques are employed, less bandwidth may be required on the network connection 110 between client system 104 and MSP 102.

Deduplication may also reduce the repetitive backup of data. For example, during the deduplication process, unique blocks of data, or byte patterns, may be identified and stored for analysis. In particular embodiments, a hash function may be run on each block of data marked for backup. The hash function produces a unique cryptographic value, such as a hash value, for the data block. The amount of memory required to store a cryptographic value is generally much smaller than that required to store the corresponding data block. As additional blocks of data are analyzed, the cryptographic values for the blocks may be compared to the stored hash values to identify repetitive data blocks. Each unique data block need only be stored once and a reference, or index key, may be used to point to the stored block of data. Because the system may identify the same block or byte pattern dozens, hundreds or even thousands of times, the amount of data that must be stored and transferred may be greatly reduced.

In certain embodiments, deduplication software may reside at MSP storage server 102, the client system 104, or both. In general, MSP storage server 102, local back up servers 108a-n, and client production servers 106a-n are each capable of transferring and storing data. Performing deduplication at MSP storage server 102 frees up resources on the client systems 104, but requires the local backup server 108 to send all of the backup data, including repetitive data, over network connection 110 between local back up server 108 and MSP storage server 102. This may be problematic where network 110 has limited bandwidth. Conversely, where data is deduplicated on the client side, such as by local backup server 108, only the non-repetitive data is sent across network 110 for backup. While client side deduplication reduces the amount of data transmitted across network 110, deduplication at the backup source requires memory and processing resources on the client side and, thus, can negatively affect applications running on client systems 104.

Figure 2:
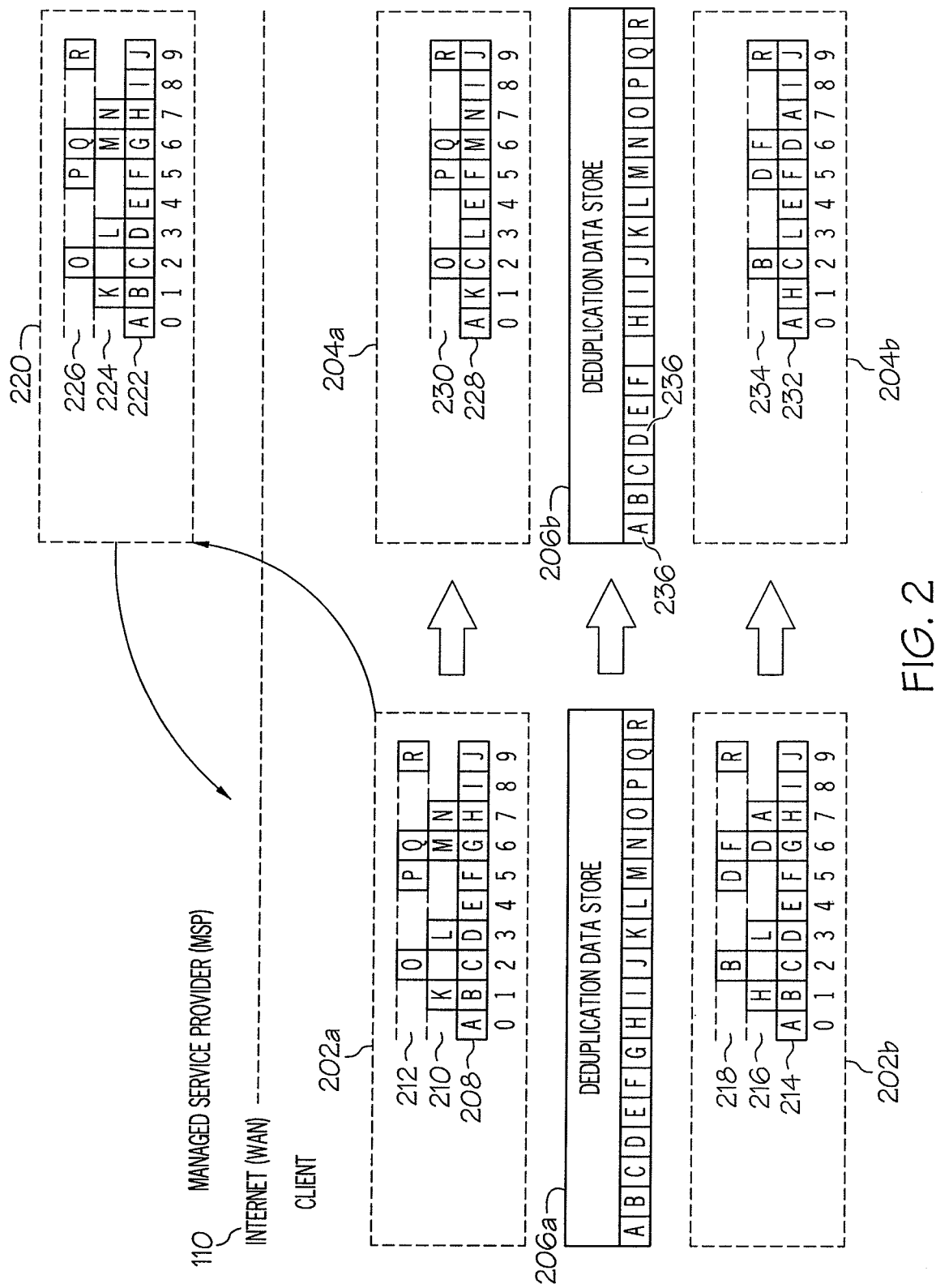
FIG. 2 illustrates a diagram depicting the state of recovery points of two example client devices before and after a purge operation according to an aspect of the disclosure.

FIG. 2 illustrates a diagram depicting the state of recovery points of two example client devices before and after a purge operation is performed according to an aspect of the disclosure. In one example, client devices 202a and 202b represent the recovery points of two productions servers such as production servers 106a and 106b as described above with regard to FIG. 1.

As depicted, each of client device 202a and client device 202b have three distinct recovery points prior to the purge operation. In the depicted example, first client system 202a has a first recovery point 208 that includes data blocks A-J that correspond with data offset blocks 0-9. First client device 202a has a second recovery point 212 that includes data blocks K, L, M, and N that correspond with data offset blocks 1, 3, 6, and 7, respectively. A third recovery point 212 of first client device 202a includes data blocks O, P, Q, and R that correspond with data offset blocks 2, 5, 6, and 9, respectively. Similar to first client device 202a, second client device 202b has a first recovery point 214 that includes data blocks A-J that also correspond to data offset blocks 0-9, respectively. However, in contrast to first client device 202a, a second recovery point 216 of second client device 202b includes H, L, D, A that correspond with data offset blocks 1, 3, 6, and 7, respectively, and a third recovery point 218 of second client device 202b includes B, D, F, and R that correspond with data offset blocks 2, 5, 6, and 9, respectively.

During the deduplication operation, the data of each device's recovery points may be deduplicated and stored in deduplication data store 206a, which may be on a local backup server similar to local backup server 108 (described above with regard to FIG. 1). Accordingly, in the example scenario depicted by FIG. 2, the data of each system is deduplicated such that deduplication data store 206a includes data blocks 208 from A-R. After the deduplication process, the data of first client device 202a may be replicated to MSP storage server 220. Thus, after the replication, MSP storage server 220 stores first recovery point 222 that includes data blocks A-J that correspond with data offset blocks 0-9; second recovery point 224 that includes data blocks K, L, M, and N that correspond with data offset blocks 1, 3, 6, and 7, respectively; and third recovery point 226 that includes data blocks O, P, Q, and R that correspond with data offset blocks 2, 5, 6, and 9, respectively.

After the replication of data to MSP storage server 220, the first recovery point 208 of first client device 202a and the first recovery point 214 of second client device 202b are purged from the local storage of the local backup server 108. First client device 202a becomes first client device 204a, and second client device 202b becomes second client device 204b.

Because first recovery points 208 and 214 were purged from first and second client devices 202a and 202b, respectively, first and second client devices 204a and 204b each include two recovery points. Thus, in the depicted example embodiment, first client device 204a has a second recovery point 228 that includes data blocks A, K, C, L, E, F, M, N, I, and J that correspond with data offset blocks 0-9. First client device 202a also has third recovery point 230 that includes data blocks O, P, Q, and R that correspond with data offset blocks 2, 5, 6, and 9, respectively. In contrast to first client device 204a, second client device 204b has a second recovery point 232 that includes data blocks A, H, C, L, E, F, D, A, I, and J that correspond to data offset blocks 0-9, respectively and a third recovery point 234 that includes data blocks B, D, F, and R that correspond with data offset blocks 2, 5, 6, and 9, respectively.

The deduplication process may again be performed with respect to first client device 204a and second client device 204b, and the data of each device's recovery points may be stored in deduplication data store 206b. In the example scenario depicted by first and second client devices 204a and 204b, the data of each device is deduplicated such that deduplication data store 206b includes data blocks 236 from A through R, except for G.

If recovery of first client device 204a is requested at this time, first client device 204a may be restored to its initial state (i.e., the state depicted as first client device 202a) from first recovery point 222 stored by MSP storage server 220. Specifically, each data block of first recovery point 222 of MSP storage server 220 may be transferred from MSP storage server 220 to first client device 204a. Thus, in the depicted example, each of data blocks A-J for first recovery point 222 may be transferred from MSP storage server 220 to first client device 204a. However, because deduplication data store 206b already stores deduplicated data blocks A-R, except for G after the purge, only data block G needs to be transferred from MSP storage server 220 to first client device 204a. Because data blocks A-F and H-R do not need to be transferred, the amount of data transferred over network connection 110 is substantially reduced.

Even without the data blocks stored in deduplication data store 206b, it may not be necessary to transfer all data blocks A-J from first recovery point 222 because some of the desired data blocks may exist on first client device 204a. Specifically, in the depicted example, data blocks A, C, E, F, I, and J are present in second recovery point 228 of first client device 204a. These locally stored data blocks can be used to restore first client device 204a to the state of first recovery point 208. Only data blocks B, D, and G, which are not stored locally, must be transferred from MSP storage server 220 to first client device 204a. Accordingly, it can be appreciated that although a data deduplication process may be used improve the efficiency and speed by which data restore is accomplished by MSP storage server 220, the efficiency of the data restore may still be improved even where deduplication is omitted.

Figure 3:
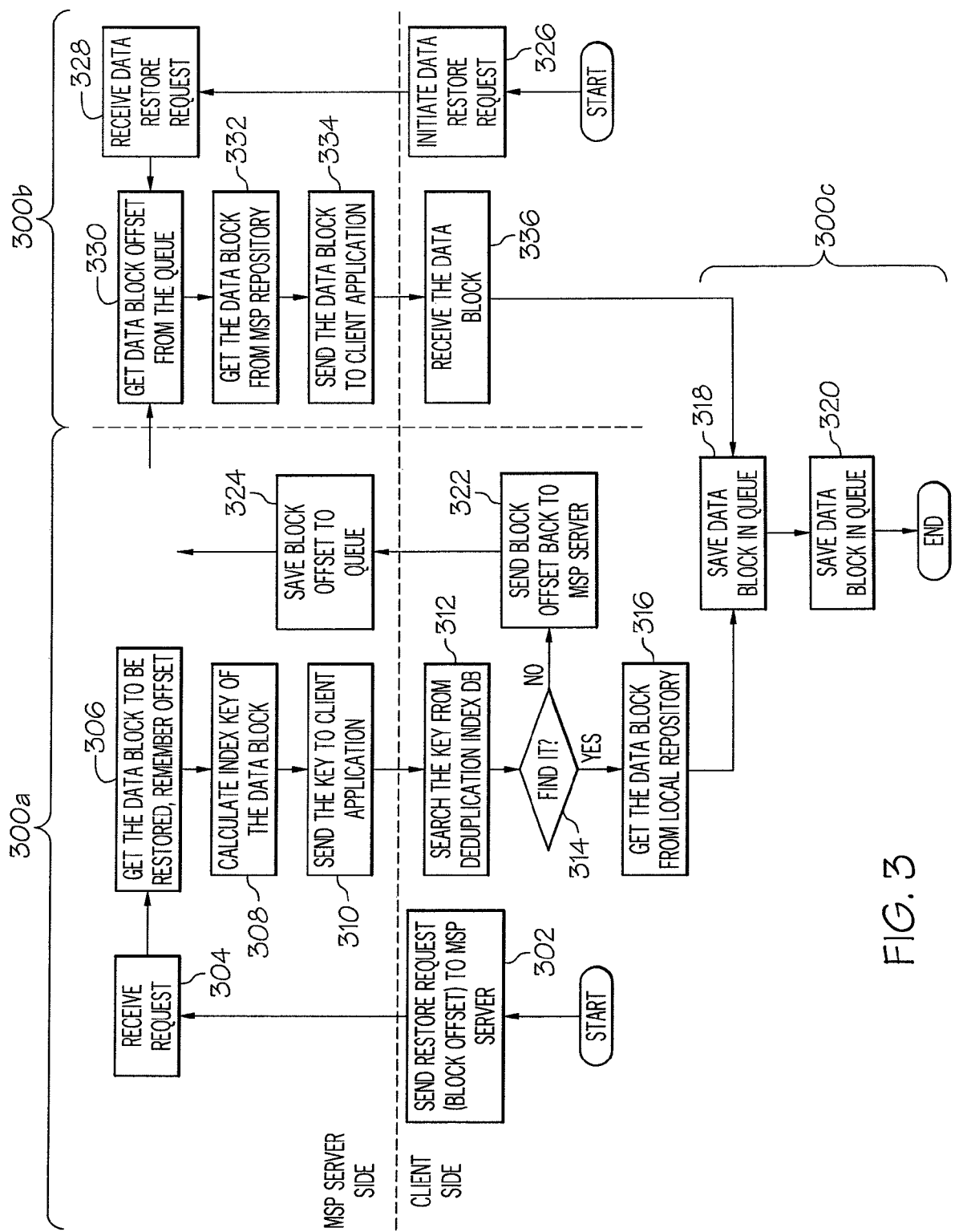
FIG. 3 illustrates a flowchart depicting a process for providing incremental data restore to a client system according to an aspect of the disclosure.

FIG. 3 illustrates a flowchart depicting a process for providing incremental data restore to a client system (such as client system 104 described above with regard to FIG. 1) according to an aspect of the disclosure. At step 302, the client system 104a sends a data restore request to MSP storage server 102. In a particular embodiment, a client application on any one of production servers 106a-n of first client system 104a may request MSP storage server 102 to restore one or more blocks of data. The request may refer to the one or more requested data blocks by offset on the disk. Thus, if the MSP storage server 102 stores data blocks corresponding to offsets 0-9, the request for data restore may identify any combination of data blocks within offsets 0-9. Though a request may identify multiple data blocks that may or may not be processed concurrently, the method will be described herein as being applied to a single data block.

At step 304, the request is received by MSP storage server 102. Based on the identified offset, MSP storage server 102 may then retrieve the data block from memory or other local MSP repository at step 306. An index key or other first data block identifier may then be generated for the retrieved data block at step 308. In a particular embodiment, an index key may include a hash key of the requested data block. Where deduplication is used by the client system 104a, the algorithm used by the MSP storage server 102 to calculate the index key should be identical to the algorithm used by client system 104. However, where MSP storage server 102 is also enabled to perform deduplication, MSP storage server 102 may reuse the index key generated by its deduplication system.

At step 310, the index key or other first data block identifier is transmitted via network 110 to the client application on first client system 104a that requested the data restore. Client system 104a then searches for the index key in a local repository such as local backup server 108 at step 314. Where the system is enabled for and uses deduplication, the deduplication data store may be searched for the index key. However, if the system is not enabled for and does not use deduplication, all of the recovery points stored in local backup server 108 may be searched for the index key. An index key for all blocks at the desired offset may be calculated for every recovery point. If any one of the calculated keys matches the index key received from the MSP storage server 102, the corresponding data block is retrieved from local backup server 108 at step 316. The retrieved data block is then stored in a restoration queue in local backup server 108 or another client-side memory at step 318. At step 320, any data blocks currently stored in the client-side restoration queue are restored.

As described above with respect to step 314, it may be determined, in some situations, that client system 104a does not store an index key or other first data block identifier in the local repository that matches an index key or other first data block identifier received from the MSP storage server 102. This may indicate that the requested data block is not stored on the local backup server 108. Accordingly, the requested data block may not be retrieved locally.

If the data block is not stored locally, the method may continue to step 322 where the client system 104a returns the block offset to MSP storage server 102. At step 324, MSP storage server 102 may then save the block offset in a restoration queue that is maintained on the MSP storage server. In a particular embodiment, the restoration queue maintained by MSP storage server 102 may include a simple first-in, first-out queue that lists block offsets waiting for process.

The steps that have been described thus far (steps 302 through 324) may be thought of a first process thread 300a that results in the identification of which data blocks may be restored from the client's local backup data server 108 and which data blocks that must be restored from the MSP storage server 102. While the first process thread 300a is being performed, a second process thread 300b may be concurrently performed. The second process thread 300b, which includes steps 326-336 and results in the recovery and transfer of any data blocks that must be transmitted from MSP storage server 102, is described now.

As illustrated, second process thread 300b may be initiated at step 326 when a restore request is initiated by client system 104a. In a particular embodiment, the data restore request initiated at step 326 may be in addition to and separate from the restore data request initiated by client system 104a at step 302. In other embodiments, the data restore request initiated at step 326 may be combined or concurrently transmitted with the restore request that is initiated by client system 104a at step 302.

In one example embodiment, a client application running on a production server 106a of client system 104a may initiate data restore with a simple request that does not contain additional parameters. In response to the request, MSP storage server 102 may receive the data restore request from client system 104a. Where the request is a simple request that does not identify the particular data blocks to be recovered, MSP storage server 102 may also perform processing to determine which data blocks should be restored.

At step 330, MSP storage server 102 may retrieve the data block offset from the restoration queue that is maintained on the MSP storage server 102. At step 332, the data block identified by the data block offset is then retrieved from a memory located on or associated with MSP storage server 102. The retrieved data block may then be transmitted to the client system 104a requesting the data restore at step 334.

At step 336, the data block is received by client system 104a. The method may then return to step 318, and the retrieved data block may be stored in a restoration queue in local backup server 108 or another client-side memory. At step 320, any data blocks currently stored in the client-side restoration queue are restored.

It may be generally recognized that the data blocks which can be restored from the local backup server 108 of a client system 104a using first process thread 300a may be available more quickly that the data blocks that must be restored from the MSP storage server 102 using second process thread 300b. As such, data blocks which can be restored from the local backup server 108 of a client system 104a may be considered "quick blocks," and the data blocks that must be restored from the MSP storage server 102 may be considered "slow blocks." However, in certain embodiments, "quick blocks" and "slow blocks" may be interspersed across the whole hard disk's data offset address space. Thus, where a disk includes 0-9 offset blocks to be restored, it may be recognized that the 0-9 offset blocks may include any number, combination, and arrangement of "quick blocks" and "slow blocks".

The process of writing the data blocks to the client system is described above with respect to steps 318 and 320 and may be thought of as a third process thread 300c. However, several strategies may be available for performing steps 318 and 320. According to a first strategy, for example, data blocks may be restored sequentially as identified by offset. Specifically, if the disk includes offsets 0-9, offset block "0" must be restored before offset block "1" according to the first strategy. As a result, if one block is not available for restore, the restoration process must be temporarily stopped and then resumed when the data block becomes available. Because data blocks are written sequentially to the disk, this strategy may result in best disk performance. However, waiting for "slow blocks" may waste time and increase the total time used to restore a whole disk.

Other strategies may be used to improve the efficiency of the restoration of data to a disk on a production server 106a, in particular embodiments. For example, a second strategy that may be used to improve the efficiency of a data restore by a MSP storage server 102 may include restoring data blocks as soon as the data blocks become available. According to this strategy, if one block is not available, the data block may be skipped and the next available data block may be processed. Once a previously unavailable data block becomes available, the data block may be restored. This strategy may improve efficiency such a system does not waste time waiting for unavailable data blocks. However, the strategy may result in substantial random access to disk and, thus may dramatically downgrade the disk's performance.

A third strategy may improve the second strategy by always trying to restore "quick blocks" and then moving back to restore all "slow blocks." However as more and more slow blocks become available and ready for restore, more memory must be allocated to hold the slow blocks. Memory usage may be a problem where a substantial number of "slow blocks" become available for restoration.

In particular embodiments, a fourth strategy may include using a dynamic window scan technique to further improve the third strategy. FIGS. 4A-4D illustrate diagrams depicting the various states of an example restoration queue maintained by client system 104a when a dynamic window scan technique is used for incremental data recovery to the client system 104a. Specifically, FIG. 4A depicts an example restoration queue 400 at a first state during the data recovery process. As depicted, restoration queue 400 may include a memory pool that includes many slots. Each slot may contain two elements: the offset for the data block and a pointer that points to the actual data of the data block. The offset 402 for each data block may be identified sequentially starting at zero. A first bitmap 404 may be used to track which data blocks have been restored and which have not. Every bit may be mapped to a data block on a disk, and all bits may be initialized to "0". Once a data block is restored, the first bitmap 404 of the data block may be changed to "1".

A second bitmap 406 may be used to track which blocks are available in restoration queue 400. For example, in a particular embodiment, when a data block is available in restoration queue 400, the second bitmap 406 for that data block may be set to "1". Conversely, when the data block is unavailable in restoration queue 400, the second bitmap 406 may be set to "0".

When the data recovery process begins, the first bitmap 404 and the second bitmap 406 may be scanned from the offset 402 beginning at "0" to the end of the disk. In a particular embodiment, restoration of a data block to the target disk may be initiated when the following conditions are met:

(1) first bitmap 404 [N]=0; and
(2) second bitmap 406 [N]=1 where N is the offset 402 of a bit.

For example, a first stage of the data recovery process is depicted in FIG. 4A. The first stage illustrates restoration queue 400a prior to the beginning of the recovery process. Because none of the data blocks have been restored, the first bitmap 404a for each data block is set to "0". It may be recognized from the illustration that, at the first stage, the data blocks 408a corresponding to offsets 0, 1, 2, and 5 are currently stored in restoration queue 400a. Stated differently, data blocks "0, 1, 2, and 5" are available in restoration queue 400a. As such, the second bitmap 406a for offsets 0, 1, 2, and 5 are set to "1". Conversely, data blocks corresponding to offsets 3, 4, and 6-15 are not present in restoration queue 400a and, thus, are unavailable. As such, second bitmap 406a for offsets 3, 4, and 6-15 are set to "0". In certain embodiments, data blocks 3 and 4 may be unavailable because they have to be retrieved from MSP storage server 102. Additionally, data blocks 6-15 may be unavailable because they also have to be retrieved from MSP storage server 102 or because first process thread 300a has not run on data blocks 6-15.

FIG. 4A includes three pointers to demonstrate the status of the recovery process at stage 1. A first, starting pointer 410a points to the first sequential offset which has not been restored. A second, ending pointer 412a points to the highest offset that is currently available. And, a third, current pointer 414a points to the offset that is going to be restored. Specifically, because stage 1 represents restoration queue 400a at the beginning of the recovery process in the depicted example, each of starting pointer 410a and current pointer 414a point to first offset "0". Conversely, ending pointer 412a points to offset 5 as being the highest offset that is currently available in restoration queue 400a. Starting pointer 410a and current pointer 414a compose a window 416a. As will be described below, the position and size of the window 416a may change during the data recovery process. Thus, window 416a may be referred to as a "dynamic window scan."

FIG. 4B illustrates a second stage of the data recovery process. The second stage illustrates restoration queue 400b at some point after data blocks 408b corresponding to offsets 0, 1, 2, and 5 have been restored. As such, the first bitmap 404b for the data blocks corresponding to offsets 0, 1, 2, and 5 are set to "1". The first bitmap 404b for the remaining offsets are set to "0".

In the depicted example embodiment, the second stage includes data blocks 408b corresponding to offsets 6, 7, 10, and 11 as being currently stored in restoration queue 400b. Thus, data blocks corresponding to offsets 6, 7, 10, and 11 are currently available in restoration queue 400b. As such, the second bitmap 406b for offsets 6, 7, 10, and 11 are set to "1". Because the data blocks corresponding to offsets 0, 1, 2, and 5 were previously restored during stage 1, the second bitmap 406b for offsets 0, 1, 2, and 5 are also set to "1". Conversely, the data blocks corresponding to offsets 3, 4, 8, 9, and 12-15 have not been restored and are not currently available and, thus, are set to "0".

Starting pointer 410b points to the offset 3, which is the offset corresponding to the first data block that has not been restored. Ending pointer 412b points to the highest offset that is currently available, and, thus, points to offset 11. Current pointer 414b points to the next offset that is going to be restored. Accordingly, current pointer 414b points to offset 6. Window 416b, which is composed of the offsets between starting pointer 410b and ending pointer 412b, includes offsets 3-11.

FIG. 4C illustrates a third stage of the data recovery process. The third stage illustrates restoration queue 400c at a point after stage 2. Thus, data blocks 408b corresponding to offsets 0, 1, 2, 5, 6, 7, 10, and 11 have been restored. As such, the first bitmap 404c for the data blocks corresponding to offsets 0, 1, 2, 5, 6, 7, 10, and 11 are set to "1". The first bitmap 404c for the remaining offsets are set to "0".

In the depicted example embodiment, the third stage includes data blocks 408c corresponding to offsets 3, 4, 12, and 13 as being currently stored in restoration queue 400c. Thus, data blocks corresponding to offsets 3, 4, 12, and 13 are currently available in restoration queue 400c. To reflect this availability, the second bitmap 406c for offsets 3, 4, 12, and 13 are set to "1". Because the data blocks corresponding to offsets 0, 1, 2, 5, 6, 7, 10, and 11 were previously restored during stages 1 and 2, the second bitmap 406c for offsets 0, 1, 2, 5, 6, 7, 10, and 11 are also set to "1". Conversely, the data blocks corresponding to offsets 8, 9, 14, and 15 have not been restored and are not currently available and, thus, are set to "0".

Starting pointer 410c points to the offset 3, which is the offset corresponding to the first data block that has not been restored. Ending pointer 412c points to the highest offset that is currently available, and, thus, points to offset 13. Current pointer 414c points to the next offset that is going to be restored. Accordingly, current pointer 414c points to offset 12. Window 416c, which is composed of the offsets between starting pointer 410c and ending pointer 412c, includes offsets 3-13.

FIG. 4D illustrates a fourth stage of the data recovery process. The fourth stage illustrates restoration queue 400d at a point after stage 3. Thus, data blocks corresponding to offsets 0, 1, 2, 5, 6, 7, 10, 11, 12, and 13 have been restored. As such, the first bitmap 404d for the data blocks corresponding to offsets 0, 1, 2, 5, 6, 7, 10, 11, 12, and 13 are set to "1". The data blocks corresponding to offsets 3 and 4 were not restored during stage 3 since the current pointer 414c was set to offset block 12. Accordingly, first bitmap 404c for offsets 3 and 4 are set to "0". Additionally, because the data blocks corresponding to offsets 8, 9, 14, and 15 have also not been restored, first bitmap 404c for offsets 8, 9, 14, and 15 are also set to "0".

In the depicted example embodiment, the fourth stage includes data blocks 408d corresponding to offsets 3, 4, 8, and 9 as being currently stored in restoration queue 400d. Thus, data blocks corresponding to offsets 3, 4, 8, and 9 are currently available in restoration queue 400d. As such, the second bitmap 406d for offsets 3, 4, 8, and 9 are set to "1". Because the data blocks corresponding to offsets 0, 1, 2, 5, 6, 7, 10, 11, 12, and 13 were previously restored during stages 1, 2, and 3, the second bitmap 406d for offsets 0, 1, 2, 5, 6, 7, 10, 11, 12, and 13 are also set to "1". Conversely, the data blocks corresponding to offsets 14 and 15 have not been restored and are not currently available and, thus, are set to "0".

Starting pointer 410d points to the offset 3, which is the offset corresponding to the first data block that has not been restored. Ending pointer 412d points to the highest offset that is currently available, and, thus, points to offset 13. Current pointer 414d points to the next offset that is going to be restored. Current pointer 414d has been advanced to the end of the offsets, but because no data blocks corresponding to offsets after offset 13 are available for recover, current pointer 414d is returned to the beginning of the offsets and is set at offset 3, which is the first available offset. Window 416d, which is composed of the offsets between starting pointer 410d and ending pointer 412d, includes offsets 3-13. During stage 4, the data blocks corresponding to offsets 3, 4, 8, and 9 will be recovered and restored on client system 104a.

In this manner, the dynamic window scan provides several technical advantages. First, the time required for waiting for the next available data block is minimized. Specifically, the dynamic window scan technique described herein never results in the restoration process being stopped to wait for any specific data block except in the instance where no data block is available. Additional advantages that may be achieved by the dynamic window scan may include minimization of random access to the target disk and controlled total memory usage. For example, greater memory being provided enables les random access to the target disk. Furthermore, the starting pointers 410a-c, ending pointers 412a-c, and current pointers 414a-c are always advanced forward through the offsets. Additionally, the current pointers 414a-c are never moved to an offset that is in front of the starting pointers 410a-c. As a result, the bits represented by the offsets after the starting pointers 410a-c will never be accessed. Such offsets can be reused to represent offset before the endpoint pointers 412a-c. Accordingly, the amount of memory required to hold the bitmap representing the offset of the whole disk may be minimized even when the disk is very large.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood, that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
   sending, from a client system, a data restore request to a remote server,
   receiving, at the client system, a data block identifier from the remote server;
   retrieving a data block associated with the data block identifier from a local backup server associated with the client system if the local backup server stores the data block;
   receiving the data block associated with the data block identifier from the remote server if the local backup server does not store the data block associated with the data block identifier;
   restoring the data block to the client system.

2. The method of claim 1, wherein the data block identifier received from the remote server comprises an index key, and wherein searching the local backup server comprises searching the local backup server for the data block that is associated with the index key.

3. The method of claim 1, wherein:
   searching the local backup server comprises searching a deduplication index for the at data block identifier; and
   identifying the data block associated with the data block identifier comprises locating the data block in a deduplication data store.

4. The method of claim 1, further comprising:
   storing a plurality of data blocks in a data restoration queue on the client system, the plurality of data blocks comprising the data block and at least one additional data block; and
   using a dynamic window scan method to determine the order in which the plurality of data blocks in the data restoration queue will be restored to the client system.

5. The method of claim 4, wherein using the dynamic window scan method comprises:
   sequentially assigning a plurality of offset identifiers to the plurality of data blocks stored in the data restoration queue; and
   dynamically tracking for each of the plurality of data blocks stored in the data restoration queue, whether said each of the plurality of data blocks have been successfully restored to the client system.

6. The method of claim 4, wherein using the dynamic window scan method comprises:
   dynamically tracking for each of the plurality of data blocks, an availability status indicating whether said each of the plurality of data blocks is available to be restored from the data restoration queue.

7. The method of claim 4, wherein the dynamic window scan method is determined at a particular time during the restoring of the data from the data restoration queue, the dynamic window including a plurality of offset identifiers including and spanning between a first offset bit associated with a first available, but unrestored data block and a second offset bit associated with a last available, but unrestored data block.

8. The method of claim 7, further comprising:
   associating a current pointer with a current offset bit that is to be restored;
   advancing the current pointer sequentially forward in the dynamic window until a last offset bit in the dynamic window is reached; and
   returning the current pointer to a first offset bit in the dynamic window.

9. The method of claim 1, further comprising:
   storing a plurality of data blocks in a data restoration queue on the client system, the plurality of data blocks comprising the data block and at least one additional data block, and
   wherein at least one of the plurality of data blocks is retrieved from the local backup server associated with the client system and at least one of the plurality of data blocks is received from the remote server.

10. A method comprising:
    receiving, at a server, a data restore request from a client system;
    transmitting, from the server, a data block identifier to the client system in response to a receipt of the data restore request;
    receiving, at the server, in response to transmitting the data block identifier to the client system, a data block request to restore a data block associated with the data block identifier to be restored from the server;
    utilizing the data block identifier to retrieve the data block associated with the data block identifier from a backup data store associated with the server; and
    transmitting, from the server, the data block retrieved from the backup data store to the client system.

11. The method of claim 10, further comprising:
prior to transmitting the block identifier, retrieving the data block from a data store on the server; and
generating the data block identifier for the data block.

12. The method of claim 11, wherein generating the data block identifier comprises performing a hash function on the data block to generate an index key.

13. A client system comprising:
a local backup server associated with the client system, the local backup server storing a plurality of data blocks;
at least one processor associated with the client system, the at least one processor having access to the local backup server and being in communication with a remote server, the at least one processor operable to:
send a data restore request to the remote server;
receive, from the remote server, a data block identifier;
retrieve a data block associated with the data block identifier from the local backup server if the local backup server stores the data block;
receive the data block associated with the data block identifier from the remote server if the local backup server does not store the data block associated with the data block identifier; and
restore the data block to the client system.

14. The client system of claim 13, wherein the data block identifier comprises an index key, and wherein the at least one processor is operable to search the local backup server for the data block that is associated with the index key.

15. The client system of claim 13, wherein:
when searching the local backup server, the at least one processor is operable to search a deduplication index for the data block identifier; and
when identifying the data block associated with the data block identifier, the at least one processor is operable to locate the data block in a deduplication data store.

16. The client system of claim 13, wherein the at least one processor is further operable to:
store a plurality of data blocks in a data restoration queue on the client system, the plurality of data blocks comprising the data block and at least one additional data block; and
use a dynamic window scan method to determine the order in which the plurality of data blocks in the data restoration queue will be restored to the client system.

17. The client system of claim 16, wherein when using the dynamic window scan method, the at least one processor is further operable to:
sequentially assign a plurality of offset identifiers to a plurality of data blocks stored in the data restoration queue; and
dynamically track for each of the plurality of data blocks in the data restoration queue, whether said each of the plurality of data blocks have been successfully restored to the client system.

18. The client system of claim 17, wherein when using the dynamic window the at least one processor is further operable to:
dynamically track for each of the plurality of data blocks, an availability status indicating whether said each of the plurality of data blocks is available to be restored from the data restoration queue.

19. The client system of claim 16, wherein a dynamic window is determined at a particular time during the restoring of the data from the data restoration queue, the dynamic window including a plurality of offset identifiers including and spanning between a first offset bit associated with a first available, but unrestored data block and a second offset bit associated with a last available, but unrestored data block.

20. The client system of claim 19, wherein the at least one processor is further operable to:
associate a current pointer with a current offset bit that is to be restored;
advance the current pointer sequentially forward in the dynamic window until a last offset bit in the dynamic window is reached; and
return the current pointer to a first offset bit in the dynamic window.

21. The client system of claim 13, wherein the at least one processor is further operable to:
store a plurality of data blocks in a data restoration queue on the client system, the plurality of data blocks comprising the data block and at least one additional data block, and
wherein at least one of the plurality of data blocks is retrieved from the local backup server associated with the client system and at least one of the plurality of data blocks is received from the remote server.

22. A server system providing data recovery to one or more client systems comprising:
a backup data store associated with the server system, the backup data store storing a plurality of data blocks;
at least one processor associated with the server system, the at least one processor having access to the backup data store and being in communication with a client system, the at least one processor operable to:
receive a data restore request from a client system;
transmit a data block identifier to the client system in response to a receipt of the data restore request;
receive a data block request to restore a data block associated with the data block identifier to be restored from the server;
utilize the data block identifier to retrieve the data block associated with the data block identifier from the backup data store associated with the server system;
transmit the data block retrieved from the backup data store to the client system; and
wherein when generating the first data block identifier the at least one processor is operable to perform a hash function on the data block to generate an index key.

23. The server system of claim 22, wherein the at least one processor is further operable to:
prior to transmitting the block identifier, retrieve the data block from a data store on the server; and
generate the data block identifier for the data block.

24. A computer program product comprising:
a non-transitory computer readable storage medium associated with a client system, the computer readable storage medium having computer readable program code embodied therewith, the computer readable program code comprising:
computer readable program code configured to send at least one data restore request to a remote server,
computer readable program code configured to receive a data block identifier from the remote server;
computer readable program code configured to retrieve a data block associated with the data block identifier from a local backup server associated the client system;
computer readable program code configured to receive the data block associated with the data block identifier from the remote server if the local backup server does not store the data block associated with the data block identifier;

computer readable program code configured to restore the data block to the client system.

25. The computer program product of claim 24 wherein the data block identifier comprises an index key, and wherein searching the local backup server comprises searching the local backup server for the data block that is associated with the index key.

26. The computer program product of claim 24, wherein:
searching the local backup server comprises searching a deduplication index for the data block identifier; and
identifying the data block associated with the data block identifier comprises locating the data block in a deduplication data store.

27. The computer program product of claim 24, wherein the computer readable program code further comprises:
computer readable program code configured to store a plurality of data blocks in a data restoration queue on the client system, the plurality of data blocks comprising the data block and at least one additional data block; and
computer readable program code configured to use a dynamic window scan method to determine the order in which the plurality of data blocks in the data restoration queue will be restored to the client system.

28. The computer program product of claim 27, wherein the computer readable program code further comprises:
computer readable program code configured to sequentially assign a plurality of offset identifiers to the plurality of data blocks stored in the data restoration queue; and
computer readable program code configured to dynamically track for each of the plurality of data blocks stored in the data restoration queue, whether said each of the plurality of data blocks have been successfully restored to the client system.

29. The computer program product of claim 27, wherein, for using the dynamic window, the computer readable program code further comprises:
computer readable program code configured to dynamically track for each of the plurality of data blocks, an availability status indicating whether said each of the plurality of data blocks is available to be restored from the data restoration queue.

30. The computer program product of claim 27, wherein the dynamic window is determined at a particular time during the restoring of the data from the data restoration queue, the dynamic window including a plurality of offset identifiers including and spanning between a first offset bit associated with a first available, but unrestored data block and a second offset bit associated with a last available, but unrestored data block.

31. The computer program product of claim 30, wherein the computer readable program code further comprises:
computer readable program code configured to associate a current pointer with a current offset bit that is to be restored;
computer readable program code configured to advance the current pointer sequentially forward in the dynamic window until a last offset bit in the dynamic window is reached; and
computer readable program code configured to return the current pointer to a first offset bit in the dynamic window.

32. The computer program product of claim 24, wherein the computer readable program code further comprises:
computer readable program code configured to store a plurality of data blocks in a data restoration queue on the client system, the plurality of data blocks comprising the data block and at least one additional data block, and
wherein at least one of the plurality of data blocks is retrieved from the local backup server associated with the client system and at least one of the plurality of data blocks is received from the remote server.

33. A computer program product comprising:
a non-transitory computer readable storage medium having computer readable program code embodied therewith, the computer readable program code comprising:
computer readable program code configured to receive a data restore request from a client system;
computer readable program code configured to transmit a data block identifier to the client system in response to a receipt of the data restore request;
computer readable program code configured to receive, in response to transmitting the data block identifier to the client system, a data block request to restore the data block associated with the data block identifier to be restored from the server;
computer readable program code configured to utilize the data block identifier to retrieve the data block associated with the data block identifier from the backup data store; and
computer readable program code configured to transmit the data block retrieved from the backup data store to the client system.

34. The computer program product of claim 33, wherein the computer readable program code further comprises:
computer readable program code configured to retrieve the data block from a data store on the server prior to transmitting the block identifier; and
computer readable program code configured to generate the data block identifier for the data block.

35. The computer program product of claim 34, wherein the computer readable program code is further configured, when generating the data block identifier, to perform a hash function on the data block to generate an index key.

* * * * *